United States Patent [19]

De Jager

[11] Patent Number: 4,755,709
[45] Date of Patent: Jul. 5, 1988

[54] ELECTRIC MACHINE HAVING MAGNETIC BEARING MEANS

[75] Inventor: Machiel J. De Jager, Eindhoven, Netherlands

[73] Assignee: U.S. Philips Corporation, New York, N.Y.

[21] Appl. No.: 884,700

[22] Filed: Jul. 11, 1986

[30] Foreign Application Priority Data

Jul. 17, 1985 [NL] Netherlands ............... 8502058

[51] Int. Cl.$^4$ ............................................. H02K 5/16
[52] U.S. Cl. ..................................... 310/90.5; 310/43
[58] Field of Search .............. 310/157, 90.5, 90, 93, 310/43

[56] References Cited

U.S. PATENT DOCUMENTS

| | | | |
|---|---|---|---|
| 2,305,416 | 12/1942 | Hansen | 310/90.5 |
| 3,201,182 | 8/1965 | Weissman | 310/90.5 |
| 3,397,929 | 8/1968 | Gill et al. | 310/90.5 |
| 3,476,449 | 11/1969 | Chaboseau et al. | 310/90.5 |
| 3,512,851 | 5/1970 | Love | 310/90.5 |
| 3,598,456 | 8/1971 | Love | 310/90.5 |
| 3,614,180 | 10/1971 | Beer | 310/90.5 |
| 3,874,750 | 4/1975 | Greig | 310/90.5 |
| 3,934,950 | 1/1976 | Kuhlmann | 310/90.5 |

Primary Examiner—Mark O. Budd
Assistant Examiner—Judson H. Jones
Attorney, Agent, or Firm—F. Brice Faller

[57] ABSTRACT

An electric machine comprises a stator 7 and a rotor 17 mounted on a rotor shaft 15. In order to preclude axial vibrations of the rotor shaft the machine is provided with a first magnet 19a incorporated in a thrust block 19 and a second magnet 23 on the rotor shaft. The first and second magnetic means cooperate with each other to urge a bearing portion 15a of the rotor shaft against a bearing surface 19b of the thrust bearing with a predetermined pressure.

5 Claims, 1 Drawing Sheet

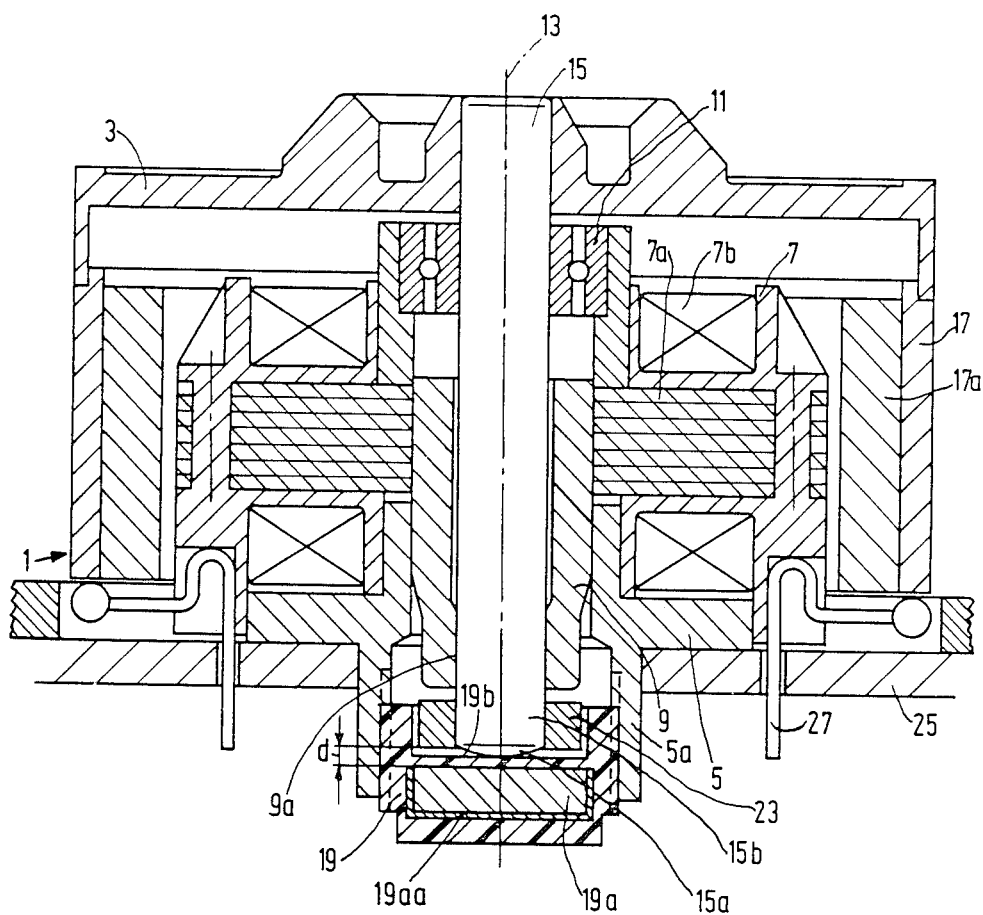

ELECTRIC MACHINE HAVING MAGNETIC BEARING MEANS

BACKGROUND OF THE INVENTION

The invention relates to an electric machine having a frame to which a stator is secured, a rotor shaft carrying a rotor which cooperates electromagnetically with the stator, and a bearing arrangement for the rotor shaft. A thrust block can be screwed into the frame, and first and second magnetic means which cooperate with one another are provided to urge a bearing member which is connected to the rotor shaft so as to be rotatable thereby against a bearing surface of the thrust block. The thrust block is the first magnetic means and the rotor shaft is provided with the second magnetic means.

Japanese Kokai 57-160346 discloses an electric motor in which the rotor shaft is supported in ball-bearings, one end of the rotor shaft being pressed against a bearing surface of a thrust block. The pressure is provided by a magnetic force which acts between a first annular permanent-magnet secured to the rotor shaft and a second annular permanent magnet which is supported by the thrust block.

A drawback of the known motor is that the use of two magnets results in a comparatively expensive construction. Moreover, the magnets are annular which from the point of view of production engineering has the disadvantage that such magnets are difficult to manufacture. This is in particular so when the magnets are made of a high-grade material such as samarium-cobalt.

SUMMARY OF THE INVENTION

A reproducible and very stable axial bearing arrangement of the rotor shaft is attainable by simple and cheap provisions. To this end the first magnetic means is constructed as a bearing element carrying the bearing surface. This enables a very efficient and compact bearing arrangement to be obtained because a part of the thrust block, namely said bearing element, is employed as the first magnetic means.

In the electric machine in accordance with the invention the first and the second magnetic means are spaced at a fixed distance from one another, which distance is independent of the position of the rotor relative to the frame. In the case of a displacement of the thrust block relative to the frame caused by a helical motion, the rotor shaft being axially movable to position it accurately relative to a reference surface, the magnetic pressure with which the bearing member on the rotor shaft is urged onto the bearing surface of the axial bearing does not change. Owing to the step in accordance with the invention it is possible to obtain a simple and cheap production method, enabling any desired pressure on the rotor shaft to be obtained in a reproducible manner. A favourable embodiment in which the second magnetic means is constructed as a ring which is secured to the rotor shaft, is characterized in that the first magnetic means is an axially magnetised permanent magnet and the second magnetic means is made of a ferromagnetic material.

To make optimum use of the magnetic bearing element, the rotor shaft is made of a ferromagnetic material.

For cost-price reasons it is favourable to manufacture the thrust block by injection-molding plastic, the entire bearing element being encapsulated in plastic. A thrust block thus manufactured also has the advantage that the bearing element is firmly embedded.

BRIEF DESCRIPTION OF THE DRAWING

FIG. 1 is a cross-sectional view of the electric machine.

DETAILED DESCRIPTION OF THE PREFERRED EMBODIMENTS

Referring to FIG. 1, a collectorless d.c. motor 1 is employed in an optical disc player, for driving a turntable 3. The motor 1 includes a frame 5 with a stator 7 having a laminated core 7a and coils 7b. A sleeve-bearing bush 9 is mounted in the frame 5 by a suitable press-fit and comprises a sleeve bearing 9a. Further, a ball-bearing 11 is mounted in the frame 5. The sleeve bearing 9a and the ball-bearing 11 serve for radially supporting a rotor shaft 5 which is rotatable about an axis of rotation 13. The rotor 17 is secured to the rotor shaft 15 via the turntable 3. On its inner side the rotor 17 is provided with a cylindrical radially magnetized permanent rotor magnet 17a.

The rotor shaft 15 is axially supported by a thrust block 19 having a bearing element 19a and which is injection-moulded of wear-resistant plastic, for example nylon with molybdenum sulphide. On its side facing the rotor shaft 15 the bearing element 19a, which together with a ferromagnetic plate 19aa is encapsulated in the plastic, is provided with a thin layer of plastic with a bearing surface 19b, which cooperates with a bearing member 15a on one end 15b of the rotor shaft 15. The thrust block 19 is provided with an external screwthread and can be screwed into an internally threaded cylindrical portion 5a of the metal frame 5.

The rotor shaft 15 is urged against the thrust block 19 by a magnetic force. This magnetic force acts between the bearing element 19a, which is constructed as an axially magnetized permanent magnet, and a ring 23 of a ferromagnetic material which is clamped onto the end 15b of the rotor shaft 15. The magnet material is preferably a high-grade magnet material such as samarium-cobalt. The magnitude of said pressure can be adapted to a specific use of the motor 1. The desired magnitude can be obtained by a suitable dimensioning and a suitable choice of the material of the bearing element 19a and the ring 23 and a suitable choice of the axial clearance d between the bearing element 19a and the ring 23.

As is apparent from the Figure, the selected axial clearance d between the bearing element 19a and the ring 23 does not change in the case of an axial displacement of the thrust block 19 as a result of a rotation of the thrust block 19 relative to the frame 5. This means that when the rotor shaft 15 with the turntable 3 is positioned relative to a reference surface, not shown, the predetermined pressure with which the rotor shaft 15 acts on the thrust block 19 does not change.

The frame 5 also carries a printed circuit board 25 provided with a pattern of printed conductors and electronic components for the purpose of electrical commutation and motor control. Further, mounting pins 27 are provided which project through the p.c. board 25 and are electrically connected to the printed conductors and the coils 7b.

Obviously the invention is not limited to the present embodiment. For example, the electric machine may be constructed as an alternator instead of as a motor.

I claim:

1. An electric machine comprising:

a frame to which a stator is secured, a rotor shaft carrying a rotor which cooperates electromagnetically with a stator, and a bearing arrangement for the rotor shaft, comprising a thrust block having a bearing surface and which can be screwed into the frame adjacent one end of the rotor shaft, first and second magnetic means which cooperate with one another being provided to urge said one end of the rotor shaft against said bearing surface, the thrust block having the first magnetic means therein and the rotor shaft having the second magnetic means fixed thereto, the entire first magnetic means being encapsulated in injection-molded plastic, said thrust block comprising said first magnetic means and said injection-molded plastic, said bearing surface being on said injection-molded plastic.

2. An electric machine as claimed in claim 1, in which the second magnetic means comprises a ring arranged on the rotor shaft opposite the bearing element, and the first magnetic means is an axially magnetized permanent magnet and the second magnetic means is made of a ferromagnetic material.

3. An electric machine as claimed in claim 2, characterized in that the rotor shaft is made of a ferromagnetic material.

4. An electric machine as claimed in claim 1, characterized in that the rotor shaft is made of a ferromagnetic material.

5. An electric machine as in claim 1 wherein said rotor shaft is arranged vertically, said one end of the rotor shaft being the bottom end.

* * * * *